United States Patent [19]

Bryant et al.

[11] Patent Number: 5,652,615

[45] Date of Patent: Jul. 29, 1997

[54] PRECISION BROADCAST OF COMPOSITE PROGRAMS INCLUDING SECONDARY PROGRAM CONTENT SUCH AS ADVERTISEMENTS

[75] Inventors: Stewart Frederick Bryant, Surrey; Shaheedur Reza Haque, London, both of England

[73] Assignee: Digital Equipment Corporation, Maynard, Mass.

[21] Appl. No.: 497,564

[22] Filed: Jun. 30, 1995

[51] Int. Cl.[6] .................................................. H04N 7/16
[52] U.S. Cl. ........................................ 348/9; 348/6
[58] Field of Search ................................ 348/9, 12, 13, 348/6, 907, 473, 461, 468, 584, 589, 14, 15, 16, 17; 455/5.1, 4.2, 6.1, 4.1; 370/94.1, 94.2; H04N 7/16, 7/173

[56] References Cited

U.S. PATENT DOCUMENTS

| | | | |
|---|---|---|---|
| 4,814,883 | 3/1989 | Perine et al. | 348/460 |
| 5,027,400 | 6/1991 | Baji et al. | 348/10 |
| 5,099,319 | 3/1992 | Esch et al. | 348/9 |
| 5,155,591 | 10/1992 | Wachob | 455/4.2 |
| 5,216,515 | 6/1993 | Steele | 455/2 |
| 5,231,494 | 7/1993 | Wachob | 348/385 |
| 5,412,416 | 5/1995 | Nemirofsky | 348/10 |
| 5,420,866 | 5/1995 | Wasilewski | 348/474 |
| 5,424,770 | 6/1995 | Schmelzer et al. | 348/9 |
| 5,446,919 | 8/1995 | Wilkins | 455/6.2 |

OTHER PUBLICATIONS

ISO/IEC JTC 1/SC 29 N 820 "Final Text for ISO/IEC DIS 13818-1: Information Technology —Generic Coding of Moving Pictures and Associated Audio Information: Systems; Attachment: Explantory Report [JTC 1/SC 29/WG 11 N 721]"; Editor: A.G. MacInnis.

Primary Examiner—John K. Peng
Assistant Examiner—Chris Grant
Attorney, Agent, or Firm—Dirk Brinkman

[57] ABSTRACT

In a broadcasting network, programs are distributed to targeted customer premises equipment. A first program source generates first segments of the program, the first segments having a first identified content. A second program source generates second segments of the program, the second segments having a second identified content. Some of the second segments are generated concurrently to have different second identified content. The segments are transported over the network to the customer premises equipment. While being transported, the segments are selectively merged to form the program. The program having temporally adjacent segments. The signals of the merged first and second segments are synchronized to a common time base, and the selection is responsive to identities of the first and second identified content of the program, and demographics of the network and customer premises equipment.

17 Claims, 7 Drawing Sheets

PRECISION BROADCAST OF COMPOSITE PROGRAMS INCLUDING SECONDARY PROGRAM CONTENT SUCH AS ADVERTISEMENTS

FIELD OF THE INVENTION

This invention relates generally to the broadcasting of programs, and more particularly to broadcasting programs to identified audiences.

BACKGROUND OF THE INVENTION

In the broadcast industry, it is an inherent problem to direct programs at desired audiences. Programs, as used herein, include multimedia presentations having video and audio components. Programs reaching targeted audiences can have increased economic value. In the prior art, broadcasters generally have little control over the distribution of their programs. For example, the potential audience of a program is generally defined by the reach of the broadcast signals.

For conventional terrestrial broadcasts, the reach of the program signals may be a circular region around the transmitter tower. For cable systems, the span of the broadcast is determined by the lay of the cables. For satellite broadcasts, the geography covered can be quite large. However, each of these modalities usually broadcasts to diverse demographic audiences located within distinct localities or communities of the broadcast region.

In the prior art, the selection of the audience is primarily done by carefully matching advertisements, and other inserted content with a continuing base program. The hope is that audiences are more likely to watch inserted advertisements which closely match the base program content. For example, household products are frequently marketed during soap operas. Likewise, advertisements for motor products are usually matched with motor sports programs. However, the broadcaster has no way to separate audiences interested in new luxury automobiles from those simply interested in motor additives and repair tools.

Traditional programs broadcast as analog signals are interrupted at epochs chosen by the originator of the program stream. Advertisements, public service information, and other content fill the interruptions. In some advanced broadcast networks, the originator of the program indicates that a "slot" is available to a downstream distributor. Local broadcasters can then fill the slot with an advertisement which exactly matches the length of time of the gap made available by the originator. However, segmentation under this approach is still largely limited by geography. All the viewers of the program receive the same single program stream where the continuing base program and short subject fillers, from a technical point of view, are indistinguishable and tightly coupled.

More recently, broadcasters have started to upgrade their analog networks to carry programs encoded in digital form. In digital form, the program stream is partitioned into one or more elementary streams. For example, a composite program stream may include a video stream, and possibly multiple audio streams. The elementary streams are encoded and compressed according to an industry standard, for example, the Motion Pictures Expert Group's standards MPEG-1 or MPEG-2. The encoded digital signals of the program stream can further be encapsulated into transport packets for ease of handling by the network.

The network can include circuits to transport the program signals to the audiences. The circuits may be a television channel, a cable channel, a satellite channel, or a virtual circuit of an asynchronous mode (ATM) telephone network. Recently, interactive television and video-on-demand type of networks may allow a greater amount of control over matching program content with audiences. However, interactive program distribution requires two-way (duplex) communication on the network. Duplex communication may not always be possible with extant networks, and generally uses substantially more complex and expensive equipment at the transmitter and receiver sites. It is desired to precisely broadcast program signals to well identified target audiences without unduly increasing the complexity of extant broadcast networks, and the processes and equipment used to originate and receive the programs.

SUMMARY OF THE INVENTION

In a broadcasting network, programs are distributed to targeted customer premises equipment. A broadcaster or cable operator generates base segments of a continuing program, the base segments having a content which is identified. The broadcaster or cable operator also generates shorter fill segments which are used as filler during interruptions in the regular continuing program. The fill segments also have their content identified. Some of the fill segments are concurrently generated to have different content. The base and fill segments are broadcast or transported over the network to the customer premises equipment. While being broadcast or transported, the base and fill segments are selectively merged to form the continuing program where the base and fill segments are temporally adjacent and the signals of the merged segments are synchronized to a common time base. The selection of the segments for merging is responsive to the identities of the content of the base and fill segments, and demographics of the network and customer premises equipment.

DETAILED DESCRIPTION OF PREFERRED EMBODIMENTS

Figure 1:
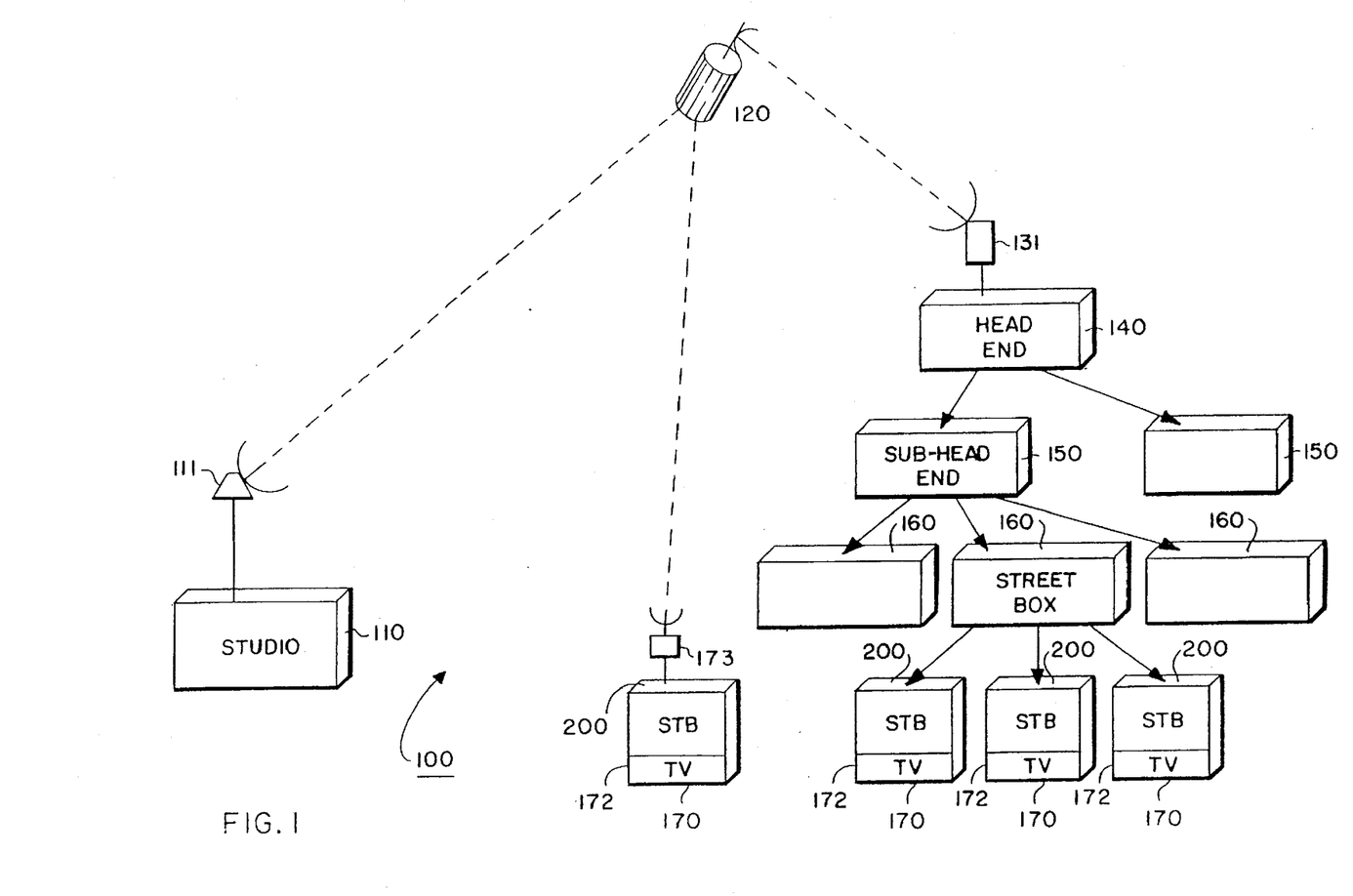
FIG. 1 is a block diagram of a networked arrangement for broadcasting programs according to an embodiment of the invention.

FIG. 1 shows a broadcast arrangement which can use the present invention to broadcast composite programs to targeted audiences. The arrangement includes a network 100, and a studio 110 connected to a transmitter 111. A satellite 120 relays the broadcast signal originating at the studio 110 to a receiver 131 at a head end 140 of a cable network. The head end 140 forwards the broadcast signals to sub-head ends 150. The sub-head ends 150 distribute the signals to street boxes 160, and from the street boxes 160, the signals are carried to customer premises equipment (CPE) 170. The CPE 170 can include a set top box (STB) 200 which is coupled to a viewing device 172, for example, a television (TV).

During operation of the network 100, programs, explained in greater detail below, can originate at the studio 110. The programs are relayed via the satellite link to the head end 140. At the head end 140, which is the cable network's equivalent of the central office (CO), the off-air programs, together with locally sourced programs, are each used to modulate their assigned radio-frequency (RF) carrier on the cable network. The RF spectrum that constitute the set of carriers can then be used to modulate a light source. In turn, the modulated light Signals are transmitted by fibre-optic cable to the sub-head ends 150.

The sub-head ends 150 are cable concentration points comparable with local telephone exchanges. The sub-head ends 150 give the cable operator the ability to manage the cable plant without the need to take all of the fibers back to the head end 140. The street boxes 160 typically are star connection points close to a group of CPE 170. The street boxes 160 take in the broadcast RF signals from the fiber, and forward the signals using coaxial cables, or asynchronous digital subscriber loops (ADSL) to the STB 200.

Traditionally, the broadcast programs are composited at the studio 110. This means that the base program, plus program inserts, such as advertisements, and other fills, are first generated at the studio. In the network 100, the mix of program and advertisements to different cable operators may be different. For example, the satellite feed to Europe may be different than the feed to Asia. In addition, local operators may supplant the network's advertisements with their own content at the head end 140. However, as explained above, in traditional program feeds, the base program and filler are generally tightly coupled with marginal audience discrimination.

Although the specific embodiments of the invention are described with respect to a satellite linked cable network, it should be understood that the invention can also be worked with other types of broadcast networks. For example, the CPE 170 can directly receive the broadcast signals from the satellite 120 if equipped with a parabolic antenna 173 and matching receiver.

Alternatively, in a terrestrial broadcast network, regional broadcast transmitters serving smaller geographic areas can retransmit the program to CPE located in remote regions. In addition, an independent local operator can originate programs at the head end 140 or at the local transmitter. The recent trend is to also allow common carriers such as telephone companies to broadcast multimedia programs using conventional public access telephone networks.

Figure 2:
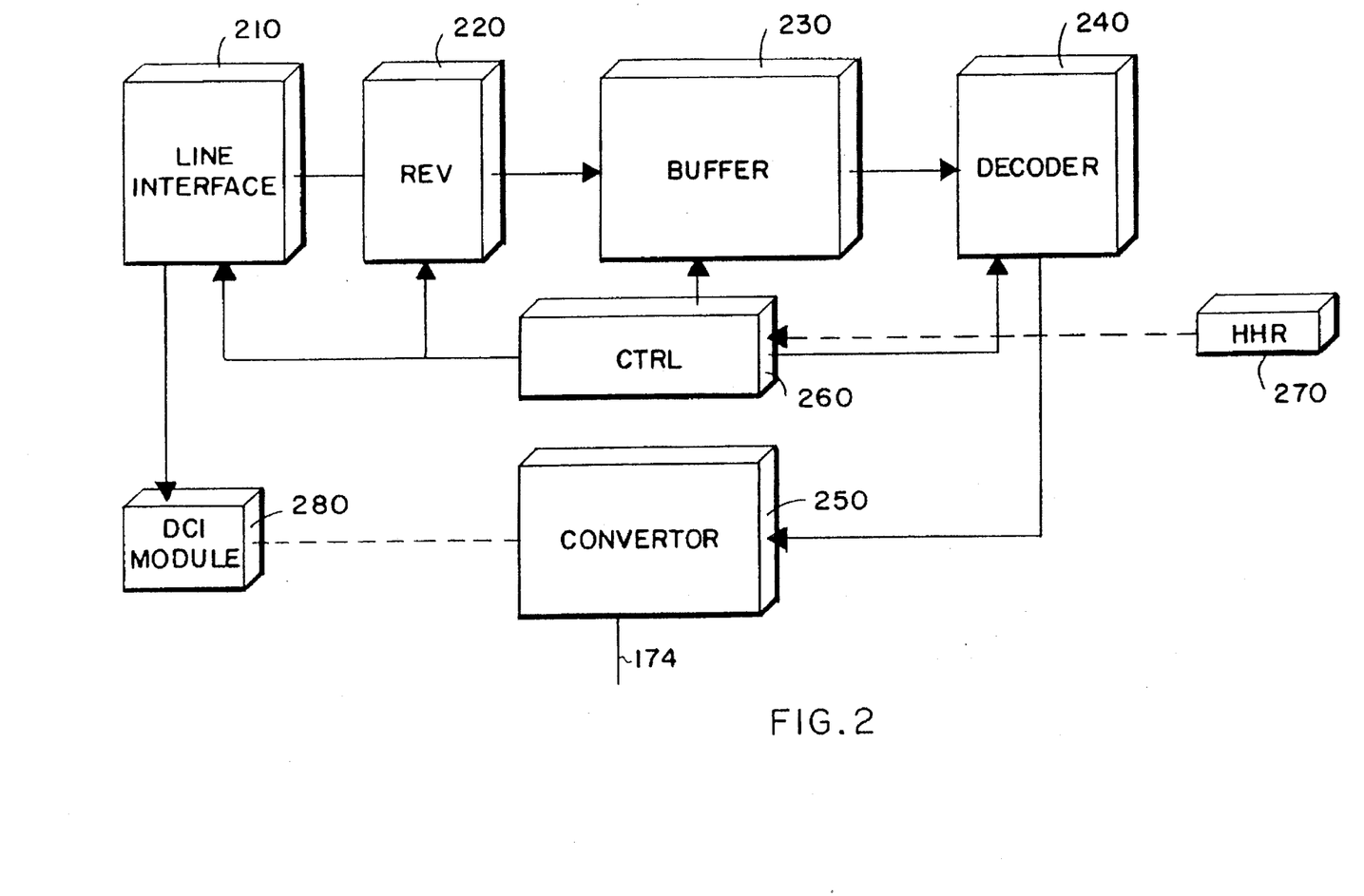
FIG. 2 is a block diagram of a customer premises equipment for receiving the programs broadcast over the network of FIG. 1.

The STB 200 is shown in greater detail in FIG. 2. The STB 200 can include a line interface 210, a receiver (RCV) 220, a memory buffer 230, a decoder 240, a convertor 250, and a controller 260. A low cost alternative STB could have the convertor 250 coupled directly to a broadcast circuit via a decryption common interface (DCI) module 280 described in greater detail below. Frequently, the STB 200 is under control by the broadcaster or cable operators. Therefore, the STB 200, though located at the customer's premises, can be considered an extension of the network.

During operation of the STB 200, broadcast signals are received by the STB 200 from the broadcast circuit or channel via the line interface 210. The interface 210 can optically or electrically connect to the network 100. The signals, while being decoded, can be buffered in the memory 230. The memory buffer 230 can also store data which is a "profile" of the customer demographics, e.g., age, income, location, etc. The profile can be used to selectively decode the broadcast signals as explained below. The convertor 250, in response to the converted signals, generates conventional analog TV signals on line 174. The customer can operate the STB 200 with a hand held remote (HHR) 270, e.g., on/off, access codes, and select programs, e.g., "tune."

The invention, in part, provides for the precise broadcasting of composite programs to targeted audiences. This requires that the base program content, e.g., the movie, the sports-cast, etc., is decoupled from the program fill, e.g., advertisements, public notices, stations breaks, video text overlays, private data, and so forth. Then, each target audience, while viewing the same base program, can be exposed to tailored fill material during program breaks, the fill material especially designed to appeal to the various target audiences based on their diverse demographics.

In general, by using decoupled broadcast signals, e.g., "base" and "fill," the invention mixes the decoupled signals in a temporal manner. Furthermore, the decoupled signals are formed of a plurality of elementary signals, e.g., video, audio, text, private, etc., which provide for additional variation in the program mix. The mixing can be done by inserting and selecting time-wise synchronized elementary signals at the various downstream distribution points of the broadcast network. Criteria for selecting and inserting can be based on program content and geographic distribution, e.g., country, municipality, street, customer premises. In addition, mixing can be performed using audience demographics determined when the CPE are activated. These criteria can be maintained as "profiles" in databases. The databases can be distributed to memories of the network. For example, memories of the head-ends, sub-heads, street boxes, or STB 200.

Figures 3, 4:
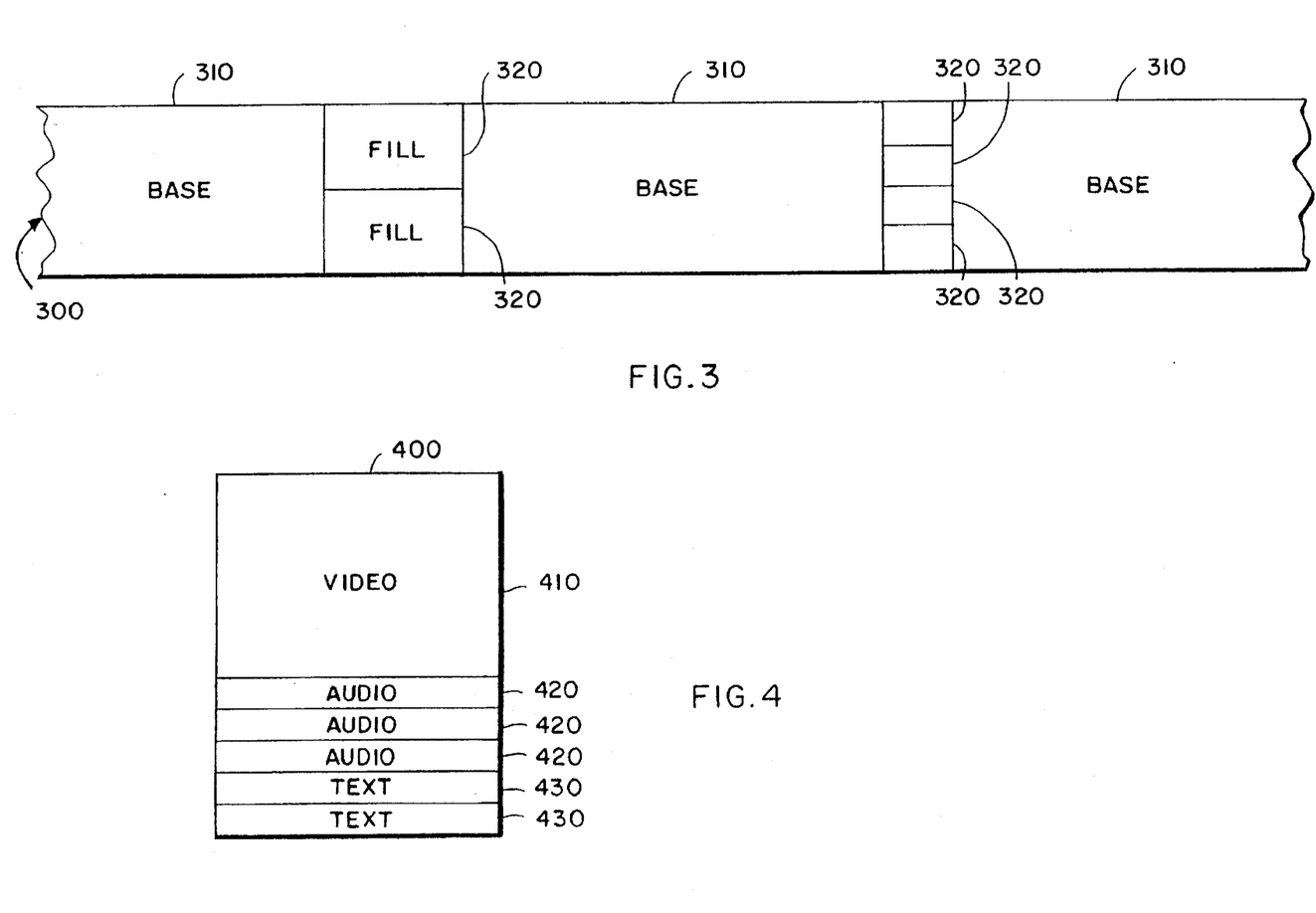
FIG. 3 is a block diagram of a program broadcast according to a preferred embodiment of the invention.
FIG. 4 is a block diagram of a segment of the program of FIG. 3.

FIG. 3 shows the composition of the broadcast signals according to a preferred embodiment of the invention. In FIG. 3, the broadcast signals are shown to be transported "downstream" from left to right. The "width" of the stream components are a relative indication of bandwidth requirements. Composite broadcast signal 300 includes first and second program segment 310 and 320, e.g., "base" and "fill." It should be understood that the invention can also be worked with programs having more than two decoupled components.

The segments are adjacently arranged in a temporal manner, substantially without overlap, and with the base and fill segments alternating. Generally, the base segments 310 are of a longer duration than the fill segments 320, however this is not required. Also, frequently the program content of the base segments is continuous, e.g., a movie, a sports cast, etc., and extending over a relatively long time period. The fill segments are generally short and disjoint, for example advertisements, station breaks, public notices, and the like.

The invention recognizes that the bandwidth required to transport the program signals can vary with respect to content. For example, a fast moving movie or high speed sporting event, e.g., "base," typically requires the full bandwidth of its assigned circuit, e.g., 6 or 8 Megabits per second (Mb/s). This is particularly true if the signals are encoded with a real-time encoder.

However, with some limited restrictions on artistic content, and with some pre-processing to remove noise, the required signaling rate for the "fill" can be reduced to, for example, 1.5 Mb/s without substantially impacting the perceived quality. Still pictures, text, and audio descriptions of fill content may further reduce bandwidth requirements for the fill segments 320.

It is proposed that multiple fill segments be concurrently carried on the circuit assigned to the program during their allocated time periods. For example, if the allocated bandwidth of the circuit carrying the signal 300 is 6 Mb/s, then during fill periods, up to two 3.0 Mb/s, or four 1.5 Mb/s fill segments can be concurrently broadcast.

The different fill segments 320 can be separately identified. The identification process and manipulation of identification information during mixing can be complex, and are described in greater detail below.

Although the broadcast modalities which can use the invention can include terrestrial, satellite, and telephone networks, cable broadcasting offers the richest set of opportunities for precision targeted advertising technology as disclosed herein. Therefore, the inserting and selecting of program broadcast signals for downstream transport is described, in part, with reference to the cable network of FIG. 1.

Program segments 310 and 320, according to the invention, can be inserted or selected at points 110, 111, 120, 131, 140, 150, 160, 170 of the network 100.

If the broadcast network is of the type which broadcasts directly from the satellite 120 to the CPE 170, the last insertion point in the downstream signaling path is the satellite uplink transmitter 111, and the discrimination point for segment selection is the STB 200. In the case of a traditional terrestrial broadcast, the insertion and selection points can be the regional broadcasters and infill transmitters that relay signals to outlying audiences.

In a preferred embodiment of the invention, the segments 310 and 320 are separately identified as described below. During distribution of the program, the broadcaster or cable operator can insert segments and select segments based on the identification of the segments. If the selection is done in the STB 200, individual customers can be targeted.

An example segment 400 is shown in FIG. 4. The segment 400 includes a video component 410, audio components 420, and text components 420. This arrangement allows for the mixing of a single video component with different audio and text portions depending on the linguistic characteristics of the intended audiences. The segments 310 and 320 can be encoded according to an industry standard, for example, MPEG.

An MPEG encoded program stream consists of transport stream of packets. The packets encode the analog signals of the program in digital format. Alternatively, using state of the art digital methods, it is possible to create packets directly. For the details on MPEG, please see "Coding of Audio, Picture, Multimedia and Hypermedia Information," ISO/IEC ITC 1/SC 29/WG, McInnes, Editor, 1994.

Figure 5:
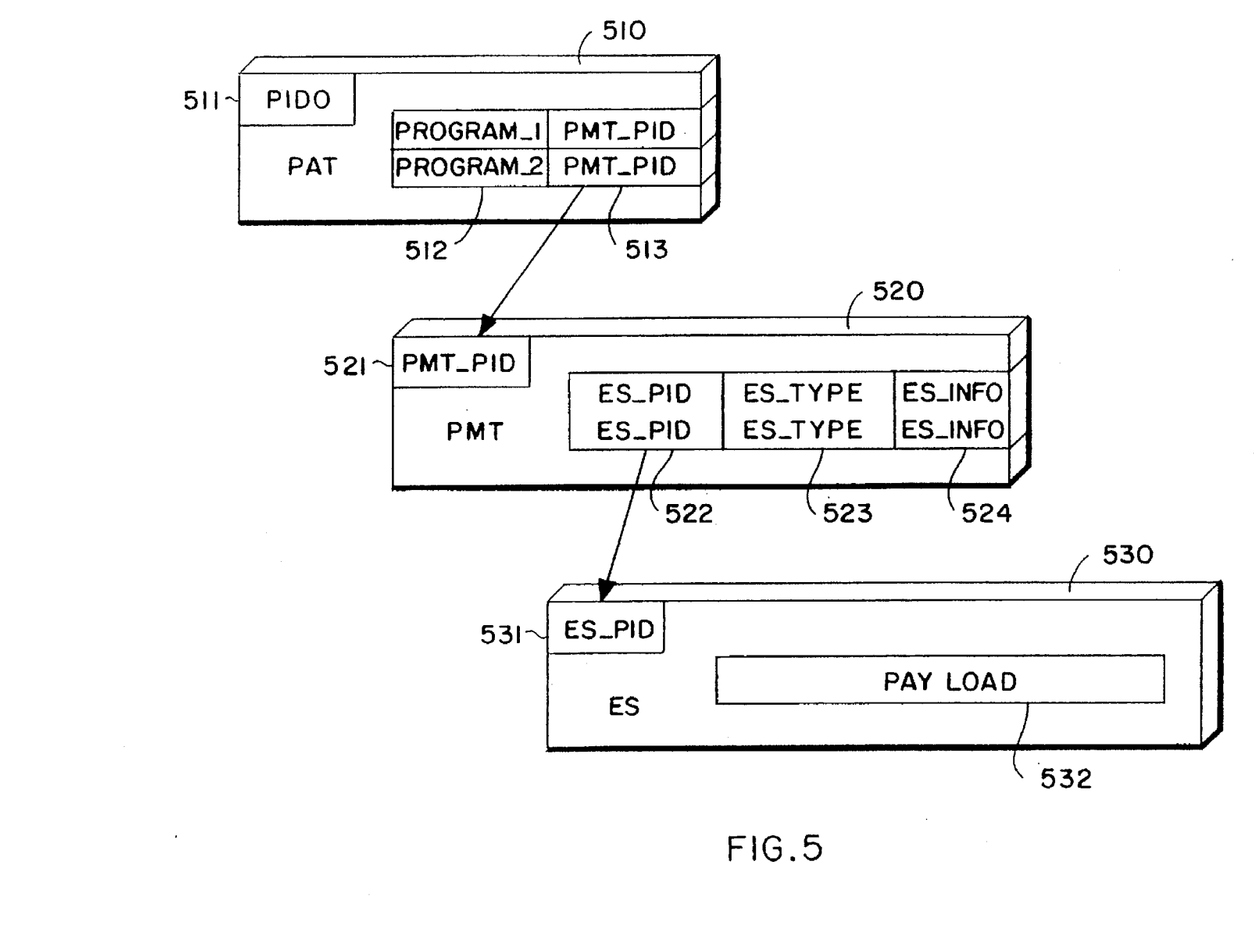
FIG. 5 is a block diagram of communication packets used to transport the program of FIG. 3.

FIG. 5 shows the content and structural relationship of the information carried in MPEG packets. The standard specification describes the structure of the packets to a higher level of detail. The standard admits many different packet types, three are of concern to this description: program association table (PAT) packets 510, program map table (PMT) packets 520, and elementary stream (ES) packets 530. Each packet is identified with a packet identifier (PID).

Program Association Table Packet

The Program Association Table (PAT) provides the correspondence between a program number (PN) and packet identifiers (PID) of the elementary streams. Each program broadcast is identified with a PN, and the packets of the program elementary streams which composite the program are assigned unique PIDs.

The PAT packet 510 is identified with a PID having a value of zero, e.g., PID0 511. The PAT packet 510 includes a list 512 of PNs, e.g., program_1, program_2, together with the values of the PIDs of the associated PMT packets 520, e.g., PMT_PID 513.

Program Map Table Packet

The PMT packet 520, identified with a PMT_PID 521, includes a list of PIDs 521 of the ES packets (ES_PID) 522 which contain program content of the referenced program. For each ES_PID listed, the ES type (ES_TYPE) 523 and other ES information (ES_INFO) 524 is also indicated. The ES_TYPE 523 can indicate, for example, audio, video, or private elementary streams. The ES_INFO 524 can indicate the nature of the program material contained in the ES packets, for example, movie, advertisements, and perhaps, the type of advertisements, and so forth.

In order to receive a complete program, the CPE 170 must receive and process all packets associated with the program. Packets which are identified with PIDs other than the ones included in the associated PAT and PMT tables 510 and 520 are to be ignored during decoding.

Elementary Stream Packet

The ES packet 530, identified by an ES_PID 531, carries payload 532. The payload 532 includes the digital signals expressing some element of the program material, e.g., audio, video, private. The ES packet 530 encodes the program signals at a rate which is commensurate with their content. Video signals generally require a higher bandwidth than audio or video text signals.

Synchronization of program signals during encoding and decoding is maintained by Program Clock References (PCR). The values of the PCR synchronize the various elementary streams of the program with respect to a common time base. The methodology used to store the PCRs values in the program bit stream are specified in the MPEG standards. For example, the standard requires that a PCR be included in the program signals at intervals not to exceed 100 milliseconds.

There are several methods which can be used to mix, e.g., insert and select, program segments 520 and 530 to compose a program as it progresses downstream over the broadcast network 100. Some of these methods may require MPEG "splicing," or a modified set top box. Other methods may be applied on existing networks with minimal additional hardware or processing. These methods are now described in greater detail.

Multiple Program Method

A broadcaster or cable operator wishing to reach different target audiences may separately identify and broadcast programs. For example, the program_1 of FIG. 5 can be targeted for a rich-retired audience, and the program_2 can be targeted for a young-married-with-children audience. Program_1 and program_2 are associated with different mapping tables 520, and therefore different elementary streams.

Figure 6:
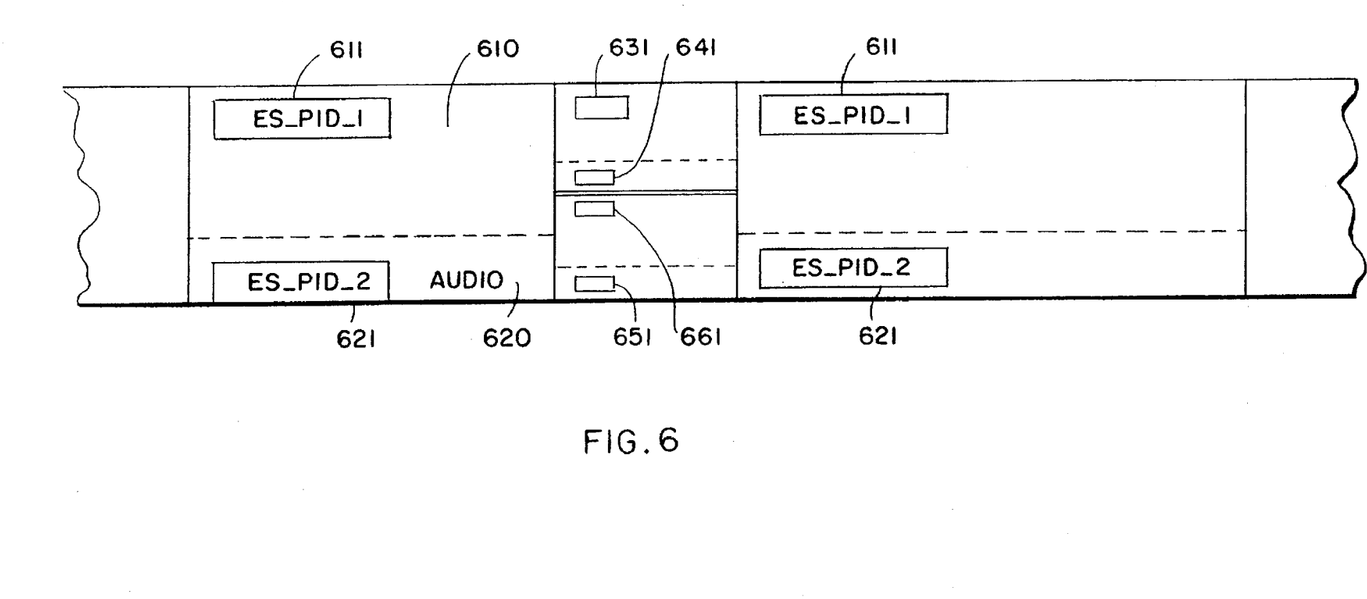
FIG. 6 is a block diagram of a composite program with decoupled components.

For example as shown in FIG. 6, the rich-retired viewers of a program_1 may watch an elementary video stream 610 with packets identified with ES_PID_1 611, and an elementary audio stream 620 identified with ES_PID_2 621. The video ES_PID_1 and audio ES_PID_2 packets constitute the base segments of the program_1. For the rich-retired viewers, the fill segments of the program_1, e.g., advertisements, may come from video and audio elementary streams having packets identified with ES_PID_3 631 and ES_PID_4 641.

The young-married-with-children viewers selected to receive a program_2 will watch the same base program, e.g., ES_PID_1 611 and ES_PID_2 621 however, the video and audio fill for this audience may come from packets identified with ES_PID_5 651 and ES_PID_6 661. Thus, for example, the street box 160 or the STB 200 of FIG. 1 can select program content for two demographically different audiences from within a single broadcast. The packets of program_1 and program_2 can be inserted at any convenient point of the network 100.

Modified PMT Method

In this approach, at the transition between the base and fill programs, a modified PMT packet is inserted in the program stream to indicate that a particular program is to include a different set of ES packets. For example, using the same PIDs of the examples above, the STB 200 of both the program_1 and program_2 audiences initially receive a PMT packet indicating that packets identified with PID_1 and PID_2 should be decoded by the decoder 240. However, at the start of a fill segment, the STB 200 receiving the program_1 receive the modified PMT packet indicating that packets with ES_PID_3 and ES_PID_4 should now be decoded. Similarly, the STB 200 of viewers of program-2 is directed to decode ES packets with ES_PID_5 and ES_PID_6. The modified PMT packet can be inserted at any convenient point of the network 100.

Dynamically Modified PID Method

In the dynamic modified PID method, the ES_PIDs 531 of the elementary stream are dynamically modified as the programs are broadcast. The STBs 200 of viewers of program_1 receive a PMT packet indicating that ES packets with ES_3 and ES_PID_4 should be decoded. However, during fill segments, the ES-PIDs of the ES packets are modified to some other number, for example, PID_21 and PID_22. ES packets having PID_5 and PID_6 are modified to be PID_3 and PID_4. Thus, the decoder 240 is tricked to decode fill material such as advertisements appropriate for the target audience. As an advantage, this method prevents the use of CPE 170 which is designed to automatically delete advertisements from the program stream. The STB 200 cannot easily distinguish base and fill program content.

Modified PAT Method

In this method, the broadcaster, or cable operator, at the beginning of a fill segment, arranges to transport a modified PAT packet 510. The modified PAT packet 510 identifies different PMT packets than the PAT packet which was received at the start of the program. Then, the decoder 240 decodes ES packets which contain fill material targeted for the respective audiences.

In general, the insertion and selection of program segments 310 and 320 is done in the network 100. This is most cost effective, and this method also gives the broadcaster and network operator a certain amount of control of the composite programs that are eventually delivered to the customers. However, in certain situations, it may be advantageous to allow the customer to control the composition of the base and fill components of programs. For example, there may be commercial or cultural inducements to pick a particular mix of base and fill content. However, in general, the broadcaster or network operator would want to control the mix of base and fill components of the program.

For example, the STB 200 can include the decryption common interface (DCI) module 280 as shown in FIG. 2. The DCI module 280 is located between the network 100 and the viewing device 172 in order to "descramble" the received programs. The DCI module 280 can be rented or sold to the customer by the broadcaster or network operator. Typically, the DCI 280 is "renewed" on a regular basis. Since the customer will probably undergo a credit check at this time, the DCI module 280 can be configured or "profiled" to decrypt programs in accordance with the customer's demographic characteristics. This approach suggests an alternative commercial model, in which the provider of fill material is decoupled from the base program originator. Thus, customers acquiring DCI modules from different vendors can be manipulated to view different fill.

Figure 7:
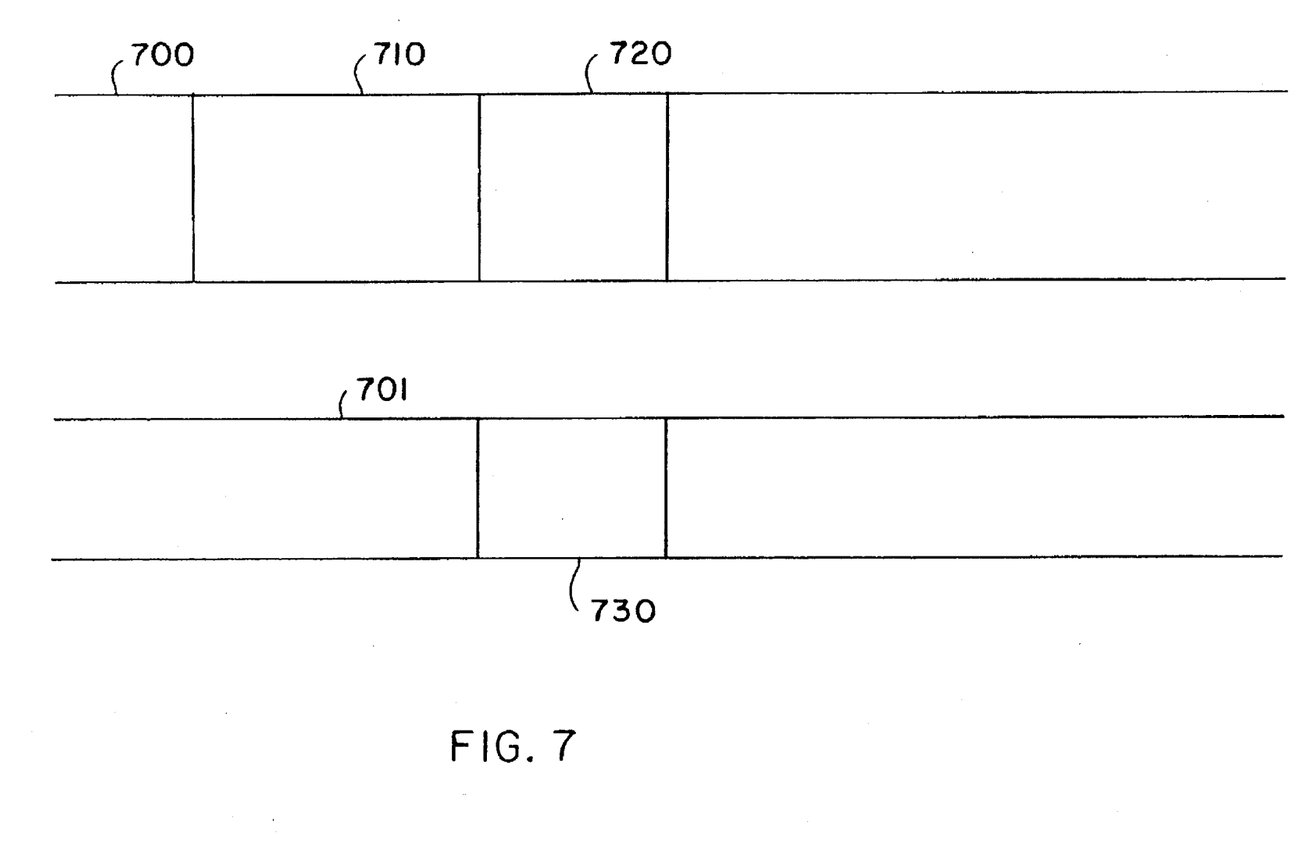
FIG. 7 is a block diagram of a program decoupled for transport over an analog broadcast network.

In an alternative embodiment, as shown in FIG. 7, the invention can be adapted to operate on programs broadcast using traditional analog signals. In an analog network, base and filler segments 710 and 720 of a program targeted for a first audience are transported over the network using a first circuit or channel 700. A filler segment 730 targeted for a second audience is transmitted over a second circuit or channel 701.

During filler breaks, the reception of the program at the customer premises equipment for the second audience is directed to the second channel 701. At the end of the filler segment, reception is switched back to the first channel 700. The signals used to indicate transitions between fill and base can be encoded in the analog frame synchronization signals, or in the blanking signals which are used during standard analog RF television broadcasts.

Figure 8:
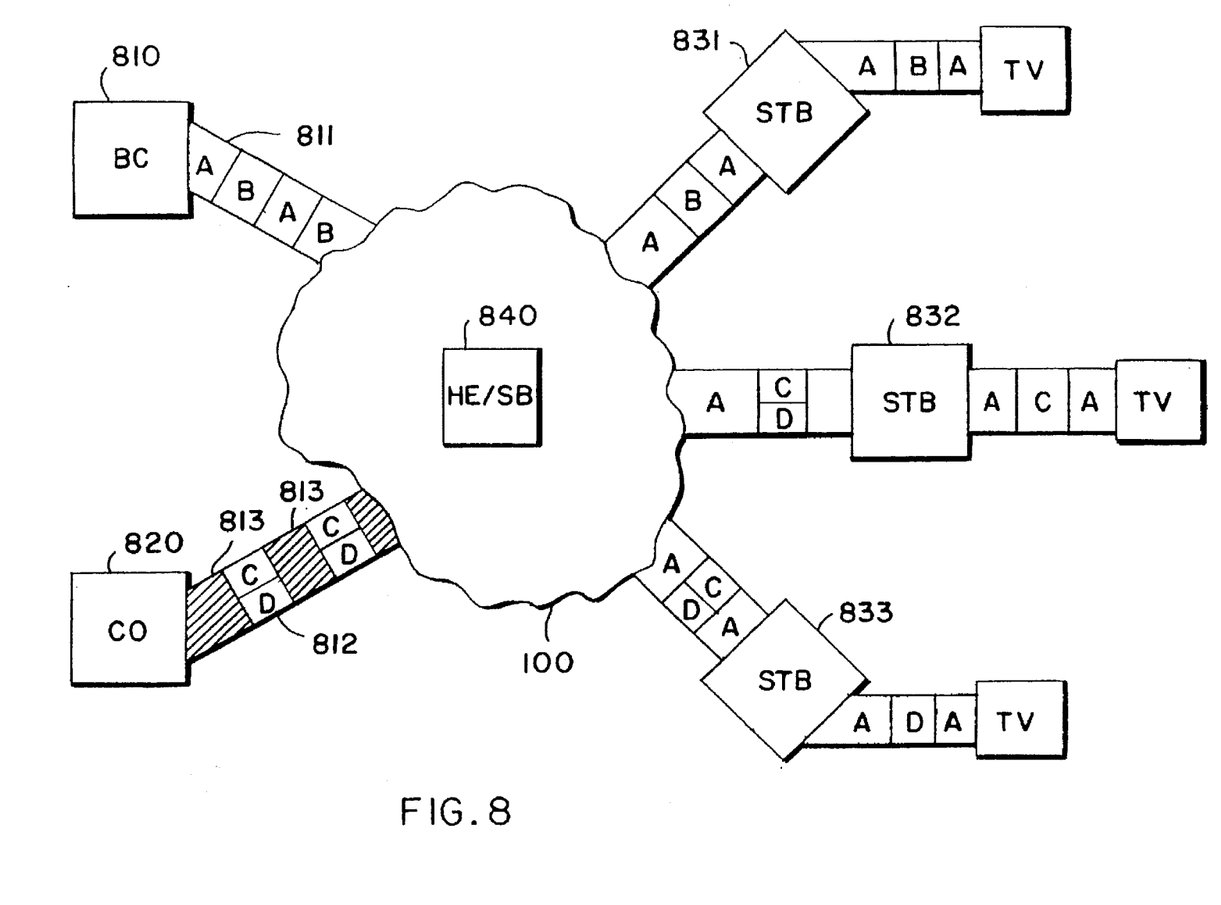
FIG. 8 is a flow diagram of precision broadcast programs.

FIG. 8 summarizes the general arrangement and operation of the invention in a simplified form. In FIG. 8, there are two sources of program content, e.g., program segments. A broadcaster (BC) generates first segments (A and B) 811. A cable operator (CO) 820 generates second segments (C and D) 812. Some of the segments, e.g., segments C and D, are generated concurrently. The signals which express the segments are synchronized to a common time base, for example, a program clock reference value of an MPEG encoded bit stream, or a chroma burst signal of an analog television signal. To maintain temporal synchronicity between signals separately generated idle or "null" signals 813 can be transported during time periods when content is not provided, e.g., the hatched area of FIG. 8.

The network 100 is used to transport the program to the STB 831–833. While being transported, the segment can be selectively mixed based on identified program content, and network and STB demographics. The mixing can be done by alternately inserting segments, or selecting only certain segments for further downstream distribution.

For example, a head-end, or street box (HE/SB) 840 mixes the segments to have STB 831 receive different content than STB 832–833. Also, STB 832 can select different content for its connected TV, even though STB 831 is "connected," perhaps, to the same street box, head-end, or satellite.

While there have been shown and described preferred embodiments of the invention, it is to be understood that various other adaptations and modifications may be made within the spirit and scope of the invention as set out in the claims appended.

We claim:

1. A method for broadcasting a program to customer premises equipment over a network, comprising:

generating first segments of the program, the first segments having a first identified content;

generating second segments of the program, the second segments having a second identified content, at least one of the second segments being currently generated with another second segment, the concurrently generated second segments having second identified contents which are different from each other;

transporting the first and second segments over the network as the program to the customer premises equipment;

selectively merging the first and second segments while transporting the program, the program having temporally adjacent first and second segments, the merged first and second segments being synchronized to a common time base, the selective merging being responsive to identities of the first and second identified contents and demographics of the network and the customer premises equipment.

2. The method of claim 1 further comprising:

inserting a replacement second segment in the program, the replacement second segment to replace a transported second segment, the content of the replacement second segment having a different second identified second content than the transported second segment; and selecting the replacement second segment having the different content for transport to the customer premises equipment.

3. The method of claim 1 further comprising:

transporting the program over a single channel of the network to a plurality of customer premises equipment, each of the plurality of customer premises equipment connected to the single channel, and each of the customer premises equipment to receive a mix of the first and second segments depending on the demographics of the network and the customer premises equipment.

4. The method of claim 1 further comprising:

generating, for each first and second segments, a plurality of elementary program streams, the plurality of elementary program streams including video and audio signals, each of the plurality of elementary program streams separately identified.

5. The method of claim 4 further comprising:

partitioning each of the plurality of elementary program streams into a plurality of transport packets, each transport packet including a packet identifier.

6. The method of claim 5 further comprising:

identifying the plurality of transport packets as a program association table packet, a program map table packet, or an elementary stream packet, and wherein each program association table packet includes a program number and packet identifiers of associated elementary streams, each program map table packet includes a list of packet identifiers of elementary stream packets, and each elementary stream packet includes signals representing the identified content.

7. The method of claim 6 further comprising:

selectively merging the first and second segments based on the program numbers of the program association table packets.

8. The method of claim 6 further comprising:

selectively merging the first and second segments based on the list of packet identifiers of the program map table packets.

9. The method of claim 6 further comprising:

selectively merging the first and second segments based on the packet identifiers of the elementary stream packets.

10. The method of claim 1 further comprising:

determining the demographics of the network and the customer premises equipment;

storing the demographics of the network and the customer premises equipment in a memory;

comparing the identities of the first and second identified contents with the demographics of the network and the customer premises equipment stored in the memory while transporting the first and second segments to selectively merge the first and second segments.

11. The method of claim 10 wherein the memory is connected to the network, and further comprising:

distributing the demographics of the network and the customer premises equipment to the memory as a demographic profile database prior to transporting the first and second segments.

12. The method of claim 1 further comprising:

encoding the first and second segments as digital signals before transporting the first and second segments.

13. The method of claim 1 further comprising:

encoding the first and second segments as analog signals before transporting the first and second segments.

14. The method of claim 13 further comprising:

transporting the first segments over a first channel of the network;

transporting the second segments over a second channel of the network;

selectively merging the first and second segments by switching the customer premises equipment to receive the program from either the first channel or from the second channel circuit depending on the identities of the first and second segments and the demographics of the network and the customer premises equipment.

15. The method of claim 1 wherein the network is a cable network including a head end, a sub-head end, and a street box connected to the customer premises equipment, and wherein the head end, the sub-head end, and the street box each includes a memory for storing the demographics of the network and the customer premises equipment, and further comprising:

selectively merging the first and second segments in the head end, the sub-head end, and the street box.

16. The method of claim 1 wherein the customer premises equipment includes a set top box having a memory, and further comprising:

selectively merging the first and second segments in the set top box.

17. An apparatus for broadcasting a program to customer premises equipment over a single channel of a network, the network including a plurality of distribution points, comprising:

means for partitioning a broadcast program into first and second segments, the first and second segments of the programs are disjoint and temporally arranged in an adjacent manner, the program including identified content;

means, responsive to characteristic of the network and the customer premises equipment and an identity of the content, for selectively merging the first and second program segments into a continuous broadcast stream for transport over the single channel of the network.

* * * * *